US012502467B2

(12) United States Patent  
Parari et al.

(10) Patent No.: US 12,502,467 B2  
(45) Date of Patent: Dec. 23, 2025

(54) FLEXIBLE TUBE ROUTING ACCESSORY FOR PERITONEAL DIALYSIS SYSTEM

(71) Applicants: MOZARC MEDICAL US LLC, Minneapolis, MN (US); Bellco S.r.l., Mirandola (IT)

(72) Inventors: Vijaya Kumar Parari, Woodland Hills, CA (US); Christopher M. Hobot, Rogers, MN (US); Kaustubh R. Patil, Plymouth, MN (US); Fabrizio Puviani, San Felice Sul Panaro (IT); Daniel Hahn, Orange, CA (US)

(73) Assignees: Mozarc Medical US LLC, Minneapolis, MN (US); Bellco S.R.L., Mirandola (IT)

( * ) Notice: Subject to any disclaimer, the term of this patent is extended or adjusted under 35 U.S.C. 154(b) by 991 days.

(21) Appl. No.: 17/541,736

(22) Filed: Dec. 3, 2021

(65) Prior Publication Data  
US 2022/0176026 A1    Jun. 9, 2022

(30) Foreign Application Priority Data

Dec. 3, 2020  (EP) ..................................... 20211677

(51) Int. Cl.  
*A61M 1/28*    (2006.01)  
*A61M 39/08*   (2006.01)

(52) U.S. Cl.  
CPC .............. *A61M 1/28* (2013.01); *A61M 39/08* (2013.01); *A61M 2039/087* (2013.01); *A61M 2209/04* (2013.01); *A61M 2210/1017* (2013.01)

(58) Field of Classification Search  
CPC .... A61M 1/14; A61M 1/28; A61M 2039/087; A61M 2209/04; A61M 2210/1017; A61M 39/08  
See application file for complete search history.

(56) References Cited

U.S. PATENT DOCUMENTS

| 271,750 | A | * | 2/1883 | Thomas | ................. | H01B 13/10 |
| | | | | | | 57/15 |
| 4,899,945 | A | * | 2/1990 | Jones | ................... | B65H 59/387 |
| | | | | | | 242/422.3 |
| 5,526,975 | A | * | 6/1996 | Endo | .................... | B65H 63/086 |
| | | | | | | 228/103 |
| 5,591,344 | A | | 1/1997 | Kenley et al. | | |
| 5,951,870 | A | | 9/1999 | Utterberg | | |
| 6,044,691 | A | | 4/2000 | Kenley et al. | | |

(Continued)

FOREIGN PATENT DOCUMENTS

CN         2697173         *  5/2005

OTHER PUBLICATIONS

Extended European Search Report dated Apr. 29, 2021 corresponding to counterpart Patent Application EP 20211677.8.

(Continued)

*Primary Examiner* — Shefali D Patel

(57) ABSTRACT

A flexible tube routing accessory for routing a flexible tube between a preparator and an automatic cycler of a peritoneal dialysis system, the flexible tube routing accessory comprising: a guide pipe through which the flexible tube is to be routed; a guide wire configured to pass through the guide pipe and selectively connect to the flexible tube; and a winding mechanism configured to move the guide wire through the guide pipe.

20 Claims, 4 Drawing Sheets

(56) References Cited

U.S. PATENT DOCUMENTS

| | | |
|---|---|---|
| 6,066,261 A | 5/2000 | Spickermann |
| 6,077,443 A | 6/2000 | Goldau |
| 6,106,776 A | 8/2000 | Borovetz et al. |
| 6,114,466 A | 9/2000 | Davankov et al. |
| 6,126,831 A | 10/2000 | Goldau et al. |
| 6,133,393 A | 10/2000 | Davankov et al. |
| 6,138,517 A | 10/2000 | Laursen et al. |
| 6,159,377 A | 12/2000 | Davankov et al. |
| 6,200,289 B1 | 3/2001 | Hochman et al. |
| 6,217,826 B1 | 4/2001 | Reeder et al. |
| 6,221,040 B1 | 4/2001 | Kleinekofort |
| 6,228,262 B1 | 5/2001 | Shin et al. |
| 6,241,945 B1 | 6/2001 | Owen |
| 6,248,087 B1 | 6/2001 | Spears et al. |
| 6,306,346 B1 | 10/2001 | Lindsay |
| 6,325,774 B1 | 12/2001 | Bene et al. |
| 6,344,139 B1 | 2/2002 | Utterberg |
| 6,348,152 B1 | 2/2002 | Kawahara et al. |
| 6,387,324 B1 | 5/2002 | Patterson et al. |
| 6,395,180 B2 | 5/2002 | Chioini et al. |
| 6,409,024 B1 | 6/2002 | Nakashima et al. |
| 6,432,309 B1 | 8/2002 | Fuke et al. |
| 6,468,427 B1 | 10/2002 | Frey |
| 6,500,151 B1 | 12/2002 | Cobb et al. |
| 6,503,451 B2 | 1/2003 | Ikeda et al. |
| 6,519,569 B1 | 2/2003 | White et al. |
| 6,526,357 B1 | 2/2003 | Soussan et al. |
| 6,537,240 B2 | 3/2003 | Cavicchioli et al. |
| 6,555,059 B1 | 4/2003 | Myrick et al. |
| 6,572,576 B2 | 6/2003 | Brugger et al. |
| 6,576,191 B1 | 6/2003 | Myrick et al. |
| 6,582,387 B2 | 6/2003 | Derek et al. |
| 6,582,811 B1 | 6/2003 | Davankov et al. |
| 6,585,675 B1 | 7/2003 | O'Mahony et al. |
| 6,592,551 B1 | 7/2003 | Cobb |
| 6,595,942 B2 | 7/2003 | Kleinekofort |
| 6,601,432 B1 | 8/2003 | Ericson et al. |
| 6,602,424 B1 | 8/2003 | Kramer et al. |
| 6,602,468 B2 | 8/2003 | Patterson et al. |
| 6,605,218 B2 | 8/2003 | Kozawa et al. |
| 6,607,697 B1 | 8/2003 | Muller |
| 6,613,280 B2 | 9/2003 | Myrick et al. |
| 6,622,542 B2 | 9/2003 | Derek et al. |
| 6,623,443 B1 | 9/2003 | Polaschegg |
| 6,626,355 B2 | 9/2003 | Sasse et al. |
| 6,627,164 B1 | 9/2003 | Wong |
| 6,632,359 B1 | 10/2003 | Uezumi et al. |
| 6,638,710 B2 | 10/2003 | Leinenbach et al. |
| 6,640,611 B2 | 11/2003 | Ericson et al. |
| 6,648,845 B1 | 11/2003 | Gotch et al. |
| 6,653,841 B1 | 11/2003 | Koerdt et al. |
| 6,673,314 B1 | 1/2004 | Burbank et al. |
| 6,676,621 B1 | 1/2004 | Menninger |
| 6,682,698 B2 | 1/2004 | Chambers et al. |
| 6,685,450 B2 | 2/2004 | Bandis et al. |
| 6,689,083 B1 | 2/2004 | Gelfand et al. |
| 6,691,040 B2 | 2/2004 | Bosetto et al. |
| 6,691,047 B1 | 2/2004 | Fredericks |
| 6,712,978 B2 | 3/2004 | Leinenbach et al. |
| 6,723,284 B1 | 4/2004 | Reeder et al. |
| 6,726,647 B1 | 4/2004 | Sternby et al. |
| 6,730,266 B2 | 5/2004 | Matson et al. |
| 6,738,052 B1 | 5/2004 | Manke et al. |
| 6,759,008 B1 | 7/2004 | Patterson et al. |
| 6,767,333 B1 | 7/2004 | Muller et al. |
| 6,773,412 B2 | 8/2004 | O'Mahony et al. |
| 6,775,577 B2 | 8/2004 | Crnkovich et al. |
| 6,786,885 B2 | 9/2004 | Hochman et al. |
| 6,796,955 B2 | 9/2004 | O'Mahony et al. |
| 6,804,991 B2 | 10/2004 | Balschat et al. |
| 6,811,707 B2 | 11/2004 | Rovatti et al. |
| 6,811,750 B2 | 11/2004 | Patterson et al. |
| 6,818,196 B2 | 11/2004 | Wong |
| 6,821,432 B2 | 11/2004 | Metzner |
| 6,830,693 B2 | 12/2004 | Govoni et al. |
| 6,843,099 B2 | 1/2005 | Derek et al. |
| 6,846,161 B2 | 1/2005 | Kline et al. |
| 6,849,235 B2 | 2/2005 | Myrick et al. |
| 6,854,620 B2 | 2/2005 | Ramey |
| 6,855,291 B2 | 2/2005 | Patterson et al. |
| 6,860,866 B1 | 3/2005 | Graf et al. |
| 6,861,266 B1 | 3/2005 | Sternby |
| 6,868,309 B1 | 3/2005 | Begelman |
| 6,877,713 B1 | 4/2005 | Gray et al. |
| 6,880,034 B2 | 4/2005 | Manke et al. |
| 6,881,344 B2 | 4/2005 | Vasta et al. |
| 6,887,216 B2 | 5/2005 | Hochman et al. |
| 6,890,315 B1 | 5/2005 | Levin et al. |
| 6,890,482 B2 | 5/2005 | Divino, Jr. et al. |
| 6,899,847 B2 | 5/2005 | Myrick et al. |
| 6,908,546 B2 | 6/2005 | Smith |
| 6,917,828 B2 | 7/2005 | Fukuda |
| 6,923,782 B2 | 8/2005 | O'Mahony et al. |
| 6,929,619 B2 | 8/2005 | Fago et al. |
| 6,929,751 B2 | 8/2005 | Bowman, Jr. et al. |
| 6,935,560 B2 | 8/2005 | Andreasson et al. |
| 6,936,221 B1 | 8/2005 | Divino, Jr. et al. |
| 6,936,222 B2 | 8/2005 | Mortensen et al. |
| 6,939,111 B2 | 9/2005 | Huitt et al. |
| 6,939,468 B2 | 9/2005 | Wang et al. |
| 6,945,954 B2 | 9/2005 | Hochman et al. |
| 6,949,214 B2 | 9/2005 | Frey |
| 6,952,963 B2 | 10/2005 | Delnevo |
| 6,960,328 B2 | 11/2005 | Bortun et al. |
| 6,966,979 B2 | 11/2005 | Pedrazzi |
| 6,994,811 B2 | 2/2006 | Kools |
| 7,001,353 B2 | 2/2006 | Bosetto et al. |
| 7,004,924 B1 | 2/2006 | Brugger et al. |
| 7,011,761 B2 | 3/2006 | Muller |
| 7,013,727 B2 | 3/2006 | Delnevo |
| 7,014,765 B2 | 3/2006 | Dannenmaier |
| 7,022,284 B2 | 4/2006 | Brian et al. |
| 7,025,226 B2 | 4/2006 | Ramey |
| 7,033,498 B2 | 4/2006 | Wong |
| 7,033,539 B2 | 4/2006 | Krensky et al. |
| 7,072,710 B2 | 7/2006 | Chamney |
| 7,077,819 B1 | 7/2006 | Goldau et al. |
| 7,077,956 B2 | 7/2006 | Rovatti |
| 7,087,033 B2 | 8/2006 | Brugger et al. |
| 7,087,168 B2 | 8/2006 | Oishi et al. |
| 7,087,269 B2 | 8/2006 | Lee et al. |
| 7,097,630 B2 | 8/2006 | Gotch et al. |
| 7,125,493 B2 | 10/2006 | Wang et al. |
| 7,131,956 B1 | 11/2006 | Pirazzoli et al. |
| 7,131,957 B2 | 11/2006 | Muller et al. |
| 7,135,156 B2 | 11/2006 | Hai et al. |
| 7,140,542 B2 | 11/2006 | Andreasson et al. |
| 7,147,616 B2 | 12/2006 | Pedrazzi et al. |
| 7,153,285 B2 | 12/2006 | Lauman et al. |
| 7,154,378 B1 | 12/2006 | Ertas et al. |
| 7,166,084 B2 | 1/2007 | Utterberg |
| 7,169,352 B1 | 1/2007 | Felt et al. |
| 7,170,591 B2 | 1/2007 | Ohishi et al. |
| 7,172,569 B2 | 2/2007 | Kleinekofort |
| 7,172,570 B2 | 2/2007 | Cavalcanti et al. |
| 7,175,081 B2 | 2/2007 | Andreasson et al. |
| 7,175,809 B2 | 2/2007 | Gelfand et al. |
| 7,182,256 B2 | 2/2007 | Andreasson et al. |
| 7,186,342 B2 | 3/2007 | Pirazzoli et al. |
| 7,186,420 B2 | 3/2007 | Chang et al. |
| 7,186,966 B2 | 3/2007 | Ai-Ali |
| 7,232,424 B2 | 6/2007 | Boyne-Aitken |
| 7,241,272 B2 | 7/2007 | Karoor et al. |
| 7,252,767 B2 | 8/2007 | Bortun et al. |
| 7,258,914 B2 | 8/2007 | Morikawa et al. |
| 7,299,981 B2 | 11/2007 | Hickle et al. |
| 7,303,540 B2 | 12/2007 | O'Mahony et al. |
| 7,311,689 B2 | 12/2007 | Levin et al. |
| 7,341,568 B2 | 3/2008 | Zhang |
| 7,347,837 B2 | 3/2008 | Azzolini |
| 7,381,195 B2 | 6/2008 | Mori et al. |
| 7,393,337 B2 | 7/2008 | Tonelli et al. |
| 7,399,289 B2 | 7/2008 | Gelfand et al. |
| 7,420,660 B2 | 9/2008 | Muller |

(56) References Cited

U.S. PATENT DOCUMENTS

| | | | |
|---|---|---|---|
| 7,422,570 | B2 | 9/2008 | Gerlach et al. |
| 7,442,302 | B2 | 10/2008 | Mabuchi et al. |
| 7,462,161 | B2 | 12/2008 | O'Mahony et al. |
| 7,488,447 | B2 | 2/2009 | Sternby |
| 7,494,590 | B2 | 2/2009 | Felding et al. |
| 7,540,851 | B2 | 6/2009 | O'Mahony et al. |
| 7,563,240 | B2 | 7/2009 | Gross et al. |
| 7,563,376 | B2 | 7/2009 | Oishi |
| 7,566,432 | B2 | 7/2009 | Wong |
| 7,575,562 | B2 | 8/2009 | Oishi et al. |
| 7,585,286 | B2 | 9/2009 | O'Mahony et al. |
| 7,592,184 | B2 | 9/2009 | Khalil et al. |
| 7,608,060 | B2 | 10/2009 | Gillespie, Jr. et al. |
| 7,615,158 | B2 | 11/2009 | Sternby et al. |
| 7,622,043 | B2 | 11/2009 | Sawada et al. |
| 7,635,349 | B2 | 12/2009 | Tribe et al. |
| 7,638,052 | B2 | 12/2009 | Mabuchi et al. |
| 7,639,136 | B1 | 12/2009 | Wass et al. |
| 7,648,474 | B2 | 1/2010 | Paolini et al. |
| 7,648,476 | B2 | 1/2010 | Bock et al. |
| 7,648,477 | B2 | 1/2010 | Vinci et al. |
| 7,661,293 | B2 | 2/2010 | Dam |
| 7,694,565 | B2 | 4/2010 | Koerdt et al. |
| 7,699,992 | B2 | 4/2010 | Sternby |
| 7,731,689 | B2 | 6/2010 | Prisco et al. |
| 7,736,507 | B2 | 6/2010 | Wong |
| 7,748,275 | B2 | 7/2010 | Kouda et al. |
| 7,749,184 | B2 | 7/2010 | Cavalcanti et al. |
| 7,749,435 | B2 | 7/2010 | Ogihara et al. |
| 7,751,043 | B2 | 7/2010 | Scarpaci et al. |
| 7,758,532 | B2 | 7/2010 | Mori et al. |
| 7,766,863 | B2 | 8/2010 | Gillespie, Jr. et al. |
| 7,771,379 | B2 | 8/2010 | Treu |
| 7,776,219 | B2 | 8/2010 | Brugger et al. |
| 7,780,618 | B2 | 8/2010 | Felt et al. |
| 7,790,113 | B2 | 9/2010 | Putnam et al. |
| 7,794,419 | B2 | 9/2010 | Paolini et al. |
| 7,815,809 | B2 | 10/2010 | Jansson et al. |
| 7,823,287 | B2 | 11/2010 | Gerlach et al. |
| 7,824,354 | B2 | 11/2010 | Vinci et al. |
| 7,837,042 | B2 | 11/2010 | Yokota et al. |
| 7,854,726 | B2 | 12/2010 | Fago et al. |
| 7,857,976 | B2 | 12/2010 | Bissler et al. |
| 7,862,530 | B2 | 1/2011 | Callan et al. |
| 7,878,783 | B2 | 2/2011 | Kunz |
| 7,896,842 | B2 | 3/2011 | Palmroos et al. |
| 7,905,853 | B2 | 3/2011 | Chapman et al. |
| 7,905,855 | B2 | 3/2011 | Childers |
| 7,906,093 | B2 | 3/2011 | Wong |
| 7,911,353 | B2 | 3/2011 | Bedingfield |
| 7,922,007 | B2 | 4/2011 | Mabuchi et al. |
| 7,922,899 | B2 | 4/2011 | Vasta et al. |
| 7,935,071 | B2 | 5/2011 | Levin et al. |
| 7,935,072 | B2 | 5/2011 | Tonelli et al. |
| 7,938,792 | B2 | 5/2011 | Roger et al. |
| 7,938,967 | B2 | 5/2011 | Folden et al. |
| 7,955,289 | B2 | 6/2011 | O'Mahony et al. |
| 7,955,291 | B2 | 6/2011 | Sternby |
| 7,959,196 | B2 | 6/2011 | Dale |
| 7,959,808 | B2 | 6/2011 | Yeager et al. |
| 7,981,280 | B2 | 7/2011 | Carr et al. |
| 7,985,196 | B2 | 7/2011 | Kopperschmidt et al. |
| 7,988,768 | B2 | 8/2011 | Yardimci et al. |
| 7,988,854 | B2 | 8/2011 | Tsukamoto |
| 7,990,272 | B2 | 8/2011 | Wass et al. |
| 7,993,297 | B2 | 8/2011 | Vinci et al. |
| 8,012,114 | B2 | 9/2011 | Daniel et al. |
| 8,034,161 | B2 | 10/2011 | Gura et al. |
| 8,035,517 | B2 | 10/2011 | Gibson |
| 8,038,886 | B2 | 10/2011 | Folden et al. |
| 8,043,076 | B2 | 10/2011 | Kopperschmidt |
| 8,051,991 | B2 | 11/2011 | Krause et al. |
| 8,066,658 | B2 | 11/2011 | Karoor et al. |
| 8,070,707 | B2 | 12/2011 | Gelfand et al. |
| 8,075,509 | B2 | 12/2011 | Molducci et al. |
| 8,078,333 | B2 | 12/2011 | Kienman et al. |
| 8,080,161 | B2 | 12/2011 | Ding et al. |
| 8,087,702 | B2 | 1/2012 | Schmidt |
| 8,088,090 | B2 | 1/2012 | Felt et al. |
| 8,091,407 | B2 | 1/2012 | Schneider et al. |
| 8,095,390 | B2 | 1/2012 | Bluemler et al. |
| 8,104,348 | B2 | 1/2012 | Balschat et al. |
| 8,104,624 | B2 | 1/2012 | Chidambaran et al. |
| 8,105,260 | B2 | 1/2012 | Tonelli et al. |
| 8,111,159 | B2 | 2/2012 | Andreasson et al. |
| 8,136,675 | B2 | 3/2012 | Buck et al. |
| 8,137,553 | B2 | 3/2012 | Fulkerson et al. |
| 8,140,274 | B2 | 3/2012 | Gagel et al. |
| 8,178,040 | B2 | 5/2012 | Brauer |
| 8,182,691 | B2 | 5/2012 | Stahl |
| 8,197,432 | B2 | 6/2012 | O'Mahony et al. |
| 8,197,745 | B1 | 6/2012 | Buck et al. |
| 8,202,428 | B2 | 6/2012 | Heilmann et al. |
| 8,202,503 | B2 | 6/2012 | Putnam et al. |
| 8,210,049 | B2 | 7/2012 | Brugger |
| 8,219,982 | B2 | 7/2012 | Harkanyi et al. |
| 8,220,643 | B2 | 7/2012 | Eisen |
| 8,240,636 | B2 | 8/2012 | Smith |
| 8,246,564 | B2 | 8/2012 | Myrick et al. |
| 8,287,736 | B2 | 10/2012 | Roncadi et al. |
| 8,298,427 | B2 | 10/2012 | Ficheux et al. |
| 8,314,740 | B2 | 11/2012 | Blumberg, Jr. |
| 8,315,654 | B2 | 11/2012 | Balschat et al. |
| 8,315,885 | B2 | 11/2012 | Krogh et al. |
| 8,317,168 | B2 | 11/2012 | Murakami |
| 8,317,499 | B2 | 11/2012 | Ibragimov |
| 8,317,738 | B2 | 11/2012 | Ishida et al. |
| 8,325,045 | B2 | 12/2012 | Dattolo et al. |
| 8,328,749 | B2 | 12/2012 | Murakami et al. |
| 8,333,724 | B2 | 12/2012 | Barrett et al. |
| 8,343,085 | B2 | 1/2013 | Toyoda et al. |
| 8,350,195 | B2 | 1/2013 | Hedmann et al. |
| 8,353,870 | B2 | 1/2013 | Levin et al. |
| 8,361,023 | B2 | 1/2013 | Bedingfield |
| 8,394,046 | B2 | 3/2013 | Nuernberger et al. |
| 8,394,321 | B2 | 3/2013 | Franzoni et al. |
| 8,398,858 | B2 | 3/2013 | Kashefi-Khorasani et al. |
| 8,400,298 | B2 | 3/2013 | Rada |
| 8,409,445 | B2 | 4/2013 | Levin et al. |
| 8,409,502 | B2 | 4/2013 | Mortensen et al. |
| 8,409,864 | B2 | 4/2013 | Ash |
| 8,425,767 | B2 | 4/2013 | Fava et al. |
| 8,430,834 | B2 | 4/2013 | Kopperschmidt |
| 8,432,547 | B2 | 4/2013 | Scarpaci et al. |
| 8,449,487 | B2 | 5/2013 | Hovland et al. |
| 8,459,543 | B2 | 6/2013 | Devergne et al. |
| 8,465,446 | B2 | 6/2013 | Chapman et al. |
| 8,480,609 | B2 | 7/2013 | Fava et al. |
| 8,485,998 | B2 | 7/2013 | Moll et al. |
| 8,486,021 | B2 | 7/2013 | Hoshide et al. |
| 8,496,824 | B2 | 7/2013 | Remkes et al. |
| 8,496,874 | B2 | 7/2013 | Gellman et al. |
| 8,497,107 | B2 | 7/2013 | Merchant |
| 8,512,271 | B2 | 8/2013 | Moissl et al. |
| 8,512,554 | B2 | 8/2013 | Yu et al. |
| 8,512,564 | B2 | 8/2013 | Bene et al. |
| 8,518,247 | B2 | 8/2013 | Akita et al. |
| 8,518,326 | B2 | 8/2013 | Brady et al. |
| 8,529,491 | B2 | 9/2013 | Beiriger |
| 8,539,573 | B2 | 9/2013 | Newlin et al. |
| 8,545,425 | B2 | 10/2013 | Lundtveit et al. |
| 8,558,964 | B2 | 10/2013 | Bedingfield |
| 8,560,510 | B2 | 10/2013 | Brueggerhoff et al. |
| 8,562,834 | B2 | 10/2013 | Kamen et al. |
| 8,562,876 | B2 | 10/2013 | Sternberg |
| 8,568,595 | B2 | 10/2013 | Castellarnau |
| 8,574,309 | B2 | 11/2013 | Galea et al. |
| 8,585,907 | B2 | 11/2013 | Raiford et al. |
| 8,585,968 | B2 | 11/2013 | Morley et al. |
| 8,596,467 | B2 | 12/2013 | Krause et al. |
| 8,597,190 | B2 | 12/2013 | Rule et al. |
| 8,597,227 | B2 | 12/2013 | Childers et al. |
| 8,597,505 | B2 | 12/2013 | Fulkerson et al. |
| 8,603,021 | B2 | 12/2013 | Levin et al. |

(56) References Cited

U.S. PATENT DOCUMENTS

| | | |
|---|---|---|
| 8,608,658 B2 | 12/2013 | Burbank et al. |
| 8,609,022 B2 | 12/2013 | Nakao et al. |
| 8,610,577 B2 | 12/2013 | Blumberg, Jr. |
| 8,617,393 B2 | 12/2013 | Remkes et al. |
| 8,625,100 B2 | 1/2014 | Hanko |
| 8,640,887 B2 | 2/2014 | Wong |
| 8,641,615 B2 | 2/2014 | Burbank et al. |
| 8,641,655 B2 | 2/2014 | Rambod et al. |
| 8,647,410 B2 | 2/2014 | Borenstein et al. |
| 8,657,775 B2 | 2/2014 | Hutchison et al. |
| 8,663,372 B2 | 3/2014 | Romdhane et al. |
| 8,672,145 B2 | 3/2014 | Eisen |
| 8,679,348 B2 | 3/2014 | Burbank et al. |
| 8,684,927 B2 | 4/2014 | Basaglia |
| 8,685,320 B2 | 4/2014 | Ogihara et al. |
| 8,687,003 B2 | 4/2014 | Dalesch et al. |
| 8,733,559 B2 | 5/2014 | Wong |
| 8,741,147 B2 | 6/2014 | Bene et al. |
| 8,747,342 B2 | 6/2014 | Caleffi et al. |
| 8,747,742 B2 | 6/2014 | Kawamura et al. |
| 8,748,538 B2 | 6/2014 | Krause et al. |
| 8,764,981 B2 | 7/2014 | Ding et al. |
| 8,764,987 B2 | 7/2014 | Gross et al. |
| 8,769,625 B2 | 7/2014 | Wang et al. |
| 8,771,215 B2 | 7/2014 | Tonelli et al. |
| 8,771,516 B2 | 7/2014 | Krause et al. |
| 8,775,196 B2 | 7/2014 | Simpson et al. |
| 8,784,668 B2 | 7/2014 | Beiriger |
| 8,803,044 B2 | 8/2014 | Kienman et al. |
| 8,813,769 B2 | 8/2014 | Gastauer et al. |
| 8,814,830 B2 | 8/2014 | Morris et al. |
| 8,828,225 B2 | 9/2014 | Okafuji et al. |
| 8,836,519 B2 | 9/2014 | Wright et al. |
| 8,845,571 B2 | 9/2014 | Kotanko et al. |
| 8,858,486 B2 | 10/2014 | Zhang et al. |
| 8,858,792 B2 | 10/2014 | Ding et al. |
| 8,864,700 B2 | 10/2014 | Kawamura et al. |
| 8,870,812 B2 | 10/2014 | Alberti et al. |
| 8,881,600 B2 | 11/2014 | Puppini et al. |
| 8,881,915 B2 | 11/2014 | Yokota et al. |
| 8,882,696 B2 | 11/2014 | Tamari |
| 8,882,704 B2 | 11/2014 | Fago et al. |
| 8,883,066 B2 | 11/2014 | Shiki |
| 8,900,173 B2 | 12/2014 | Sugioka |
| 8,905,959 B2 | 12/2014 | Basaglia |
| 8,906,240 B2 | 12/2014 | Crnkovich et al. |
| 8,906,300 B2 | 12/2014 | Wang et al. |
| 8,911,629 B2 | 12/2014 | Tsukamoto |
| 8,924,458 B2 | 12/2014 | Levin et al. |
| 8,926,544 B2 | 1/2015 | Hogard |
| 8,937,553 B2 | 1/2015 | Fujioka et al. |
| 8,950,241 B2 | 2/2015 | Hedmann et al. |
| 8,992,777 B2 | 3/2015 | Doyle |
| 9,005,153 B2 | 4/2015 | Kopperschmidt et al. |
| 9,022,981 B2 | 5/2015 | Oestereich et al. |
| 9,028,740 B2 | 5/2015 | Gohl et al. |
| 9,033,908 B2 | 5/2015 | Schilthuizen et al. |
| 9,050,411 B2 | 6/2015 | Kelly et al. |
| 9,072,830 B2 | 7/2015 | Kelly et al. |
| 9,072,831 B2 | 7/2015 | Kelly et al. |
| 9,072,843 B2 | 7/2015 | Kelly et al. |
| 9,080,985 B2 | 7/2015 | Stevenson et al. |
| 9,095,661 B2 | 8/2015 | Bene |
| 9,117,012 B2 | 8/2015 | Basaglia |
| 9,119,949 B2 | 9/2015 | Brandl et al. |
| 9,140,251 B2 | 9/2015 | Beiriger |
| 9,155,825 B2 | 10/2015 | Kelly et al. |
| 9,161,980 B2 | 10/2015 | Ernebrant et al. |
| 9,162,020 B2 | 10/2015 | Vantard et al. |
| 9,165,112 B2 | 10/2015 | Doyle et al. |
| 9,173,988 B2 | 11/2015 | Barrett et al. |
| 9,174,172 B2 | 11/2015 | Shiki |
| 9,178,891 B2 | 11/2015 | Wang et al. |
| 9,180,238 B2 | 11/2015 | Bedingfield et al. |
| 9,187,744 B2 | 11/2015 | Merchant |
| 9,189,597 B2 | 11/2015 | Bluemler et al. |
| 9,199,023 B2 | 12/2015 | Takeuchi |
| 9,199,024 B2 | 12/2015 | Sasaki et al. |
| 9,199,205 B2 | 12/2015 | Weber et al. |
| 9,203,143 B2 | 12/2015 | Blumberg, Jr. |
| 9,205,247 B2 | 12/2015 | Ueda et al. |
| 9,208,296 B1 | 12/2015 | Romanick |
| 9,211,369 B2 | 12/2015 | Gartner et al. |
| 9,212,988 B2 | 12/2015 | Akita et al. |
| 9,215,985 B2 | 12/2015 | Gross et al. |
| 9,216,246 B2 | 12/2015 | Kelly et al. |
| 9,220,827 B2 | 12/2015 | Meibaum et al. |
| 9,220,832 B2 | 12/2015 | Weaver et al. |
| 9,226,999 B2 | 1/2016 | Nakel et al. |
| 9,234,302 B2 | 1/2016 | Weber et al. |
| 9,242,035 B2 | 1/2016 | Karoor |
| 9,242,036 B2 | 1/2016 | Bluchel et al. |
| 9,243,625 B2 | 1/2016 | Brandl et al. |
| 9,243,991 B2 | 1/2016 | Wagner et al. |
| 9,250,216 B2 | 2/2016 | Wright et al. |
| 9,254,279 B2 | 2/2016 | Karoor et al. |
| 9,267,500 B2 | 2/2016 | Gronau et al. |
| 9,270,010 B2 | 2/2016 | Blumberg, Jr. |
| 9,272,127 B2 | 3/2016 | Rada et al. |
| 9,278,168 B2 | 3/2016 | Gellman et al. |
| 9,283,246 B2 | 3/2016 | Fenn et al. |
| 9,283,310 B2 | 3/2016 | Royer et al. |
| 9,289,545 B2 | 3/2016 | Olde et al. |
| 9,293,110 B2 | 3/2016 | Dolgos et al. |
| 9,295,394 B2 | 3/2016 | Kopperschmidt et al. |
| 9,295,778 B2 | 3/2016 | Kamen et al. |
| 9,296,611 B2 | 3/2016 | Wong |
| 9,302,037 B2 | 4/2016 | Wilt et al. |
| 9,308,308 B2 | 4/2016 | Ding et al. |
| 9,310,232 B2 | 4/2016 | Heide et al. |
| 9,311,448 B2 | 4/2016 | Gruendken et al. |
| 9,314,207 B2 | 4/2016 | Marterstock |
| 9,314,480 B2 | 4/2016 | Jansson et al. |
| 9,314,560 B2 | 4/2016 | Wiktor |
| 9,320,845 B2 | 4/2016 | Falkenhagen et al. |
| 9,345,827 B2 | 5/2016 | Hertz |
| 9,352,083 B2 | 5/2016 | Heitmeier et al. |
| 9,352,139 B2 | 5/2016 | Reiter et al. |
| 9,352,283 B2 | 5/2016 | Ying et al. |
| 9,353,220 B2 | 5/2016 | Savariar et al. |
| 9,354,640 B2 | 5/2016 | Byler |
| 9,360,129 B2 | 6/2016 | Smith |
| 9,364,597 B2 | 6/2016 | Wolff et al. |
| 9,364,602 B2 | 6/2016 | Kelly et al. |
| 9,364,604 B2 | 6/2016 | Ferrarini et al. |
| 9,370,614 B2 | 6/2016 | Ahrens |
| 9,375,524 B2 | 6/2016 | Levin et al. |
| 9,383,288 B2 | 7/2016 | Solem et al. |
| 9,387,441 B2 | 7/2016 | Ding et al. |
| 9,399,092 B2 | 7/2016 | Christmann |
| 9,400,199 B2 | 7/2016 | Wolff |
| 9,402,941 B2 | 8/2016 | Rambod et al. |
| 9,402,945 B2 | 8/2016 | Hogard et al. |
| 9,402,987 B2 | 8/2016 | Kamen et al. |
| 9,404,825 B2 | 8/2016 | Katz et al. |
| 9,408,958 B2 | 8/2016 | Wang et al. |
| 9,415,201 B2 | 8/2016 | Marterstock |
| 9,427,513 B2 | 8/2016 | Holmer et al. |
| 9,427,518 B2 | 8/2016 | Brueckner |
| 9,433,356 B2 | 9/2016 | Olde et al. |
| 9,435,459 B2 | 9/2016 | Bedingfield |
| 9,436,802 B2 | 9/2016 | Romanick |
| 9,440,198 B2 | 9/2016 | McCloskey et al. |
| 9,442,036 B2 | 9/2016 | Furmanski et al. |
| 9,452,252 B2 | 9/2016 | Kopperschmidt |
| 9,463,202 B2 | 10/2016 | Jansson et al. |
| 9,463,266 B2 | 10/2016 | Noguchi et al. |
| 9,470,341 B2 | 10/2016 | Brehm et al. |
| 9,474,846 B2 | 10/2016 | Steger |
| 9,488,510 B2 | 11/2016 | Beavis et al. |
| 9,492,794 B2 | 11/2016 | Yokota et al. |
| 9,504,778 B2 | 11/2016 | Hopping et al. |
| 9,514,322 B2 | 12/2016 | Golshenas |
| 9,514,518 B2 | 12/2016 | Gillespie et al. |

(56) References Cited

U.S. PATENT DOCUMENTS

| | | |
|---|---|---|
| 9,517,296 B2 | 12/2016 | Fulkerson et al. |
| 9,518,958 B2 | 12/2016 | Wilt et al. |
| 9,527,040 B2 | 12/2016 | Krause et al. |
| 9,527,627 B2 | 12/2016 | Eyrard et al. |
| 9,542,578 B2 | 1/2017 | Pattolo et al. |
| 9,545,469 B2 | 1/2017 | Curtis et al. |
| 9,548,533 B2 | 1/2017 | Blumberg, Jr. |
| 9,550,021 B2 | 1/2017 | Beden et al. |
| 9,555,146 B2 | 1/2017 | Fehr et al. |
| 9,555,181 B2 | 1/2017 | Hedmann et al. |
| 9,568,432 B2 | 2/2017 | Baxi et al. |
| 9,582,645 B2 | 2/2017 | Yu et al. |
| 9,585,992 B2 | 3/2017 | Bene |
| 9,599,599 B2 | 3/2017 | Ash et al. |
| 9,612,182 B2 | 4/2017 | Olde et al. |
| 9,616,160 B2 | 4/2017 | Daniel |
| 9,616,161 B2 | 4/2017 | Jansson et al. |
| 9,616,163 B2 | 4/2017 | Wong et al. |
| 9,616,164 B2 | 4/2017 | Nuernberger |
| 9,616,393 B2 | 4/2017 | Hidaka et al. |
| 9,635,111 B2 | 4/2017 | Wang et al. |
| 9,636,447 B2 | 5/2017 | Olde et al. |
| 9,642,961 B2 | 5/2017 | Kelly et al. |
| 9,655,922 B1 | 5/2017 | Jansson et al. |
| 9,662,485 B2 | 5/2017 | Chung et al. |
| 9,675,743 B2 | 6/2017 | Raiford et al. |
| 9,675,745 B2 | 6/2017 | Kelly et al. |
| 9,682,184 B2 | 6/2017 | Wong |
| 9,703,926 B2 | 7/2017 | Dolgos et al. |
| 9,707,329 B2 | 7/2017 | Merchant et al. |
| 9,713,670 B2 | 7/2017 | Herrmann et al. |
| 9,724,455 B2 | 8/2017 | Kopperschmidt et al. |
| 9,742,065 B2 | 8/2017 | Blumberg, Jr. |
| 9,744,300 B2 | 8/2017 | Kamen et al. |
| 9,750,865 B2 | 9/2017 | Vasta et al. |
| 9,752,730 B2 | 9/2017 | Voelz |
| 9,757,503 B2 | 9/2017 | Haecker et al. |
| 9,770,546 B2 | 9/2017 | Vasta |
| 9,775,937 B2 | 10/2017 | Wang et al. |
| 9,776,143 B2 | 10/2017 | Krause et al. |
| 9,782,528 B2 | 10/2017 | Balschat et al. |
| 9,791,270 B2 | 10/2017 | Paolini et al. |
| 9,795,731 B2 | 10/2017 | Kelly et al. |
| 9,795,932 B2 | 10/2017 | Yokota et al. |
| 9,802,162 B2 | 10/2017 | Hildwein et al. |
| 9,806,399 B2 | 10/2017 | Blumberg, Jr. |
| 9,808,586 B2 | 11/2017 | Kogan |
| 9,821,102 B2 | 11/2017 | Jansson et al. |
| 9,821,106 B1 | 11/2017 | Vasta et al. |
| 9,821,107 B2 | 11/2017 | Weaver et al. |
| 9,833,556 B2 | 12/2017 | Olde et al. |
| 9,836,185 B2 | 12/2017 | O'Mahony et al. |
| 9,844,620 B2 | 12/2017 | Stuva et al. |
| 9,846,085 B2 | 12/2017 | Newell et al. |
| 9,849,228 B2 | 12/2017 | Noack et al. |
| 9,855,380 B2 | 1/2018 | Ritter et al. |
| 9,878,086 B2 | 1/2018 | Kleinekofort |
| 9,883,799 B2 | 2/2018 | Kotanko et al. |
| 9,889,244 B2 | 2/2018 | Arrizza et al. |
| 9,901,669 B2 | 2/2018 | Wolff et al. |
| 9,901,726 B2 | 2/2018 | Stenzel et al. |
| 9,907,897 B2 * | 3/2018 | Burbank ............. A61M 1/1674 |
| 9,907,898 B2 | 3/2018 | Hedmann et al. |
| 9,921,271 B2 | 3/2018 | Labarthe et al. |
| 9,925,155 B2 | 3/2018 | Forsback et al. |
| 9,925,320 B2 | 3/2018 | Childers et al. |
| 9,933,391 B2 | 4/2018 | Hollstein |
| 9,950,104 B2 | 4/2018 | Gronau et al. |
| 9,974,895 B2 | 5/2018 | Storr et al. |
| 9,987,411 B2 | 6/2018 | Planas et al. |
| 9,993,777 B2 | 6/2018 | Hayashi et al. |
| 10,002,190 B2 | 6/2018 | West |
| 10,022,484 B2 | 7/2018 | Brugger et al. |
| 10,024,442 B2 | 7/2018 | Maenz et al. |
| 10,044,791 B2 | 8/2018 | Kamen et al. |
| 10,057,997 B2 | 8/2018 | Schafer et al. |
| 10,058,692 B2 | 8/2018 | Geiger et al. |
| 10,080,996 B2 | 9/2018 | Berzinis et al. |
| 10,099,000 B2 | 10/2018 | Strohhoefer et al. |
| 10,101,316 B2 | 10/2018 | Wolff et al. |
| 10,130,749 B2 | 11/2018 | Schade |
| 10,149,938 B2 | 12/2018 | Murphy et al. |
| 10,172,990 B2 | 1/2019 | Stenzel et al. |
| 10,188,991 B2 | 1/2019 | Menda et al. |
| 10,203,273 B2 | 2/2019 | Burkert |
| 10,247,663 B2 | 4/2019 | Janik et al. |
| 10,300,187 B2 | 5/2019 | Lisitschew |
| 10,307,531 B2 | 6/2019 | Faulhaber et al. |
| 10,322,220 B2 | 6/2019 | Riemenschneider |
| 10,391,228 B2 | 8/2019 | Kelly et al. |
| 2003/0042040 A1 | 3/2003 | Komiya et al. |
| 2004/0086927 A1 * | 5/2004 | Atwood ................ B01L 7/00 435/6.1 |
| 2017/0281846 A1 * | 10/2017 | Manda ................ A61K 31/19 |
| 2023/0201431 A1 | 6/2023 | Friederichs |
| 2023/0277738 A1 | 9/2023 | Ekdahl et al. |

OTHER PUBLICATIONS

Notice of Intent to Grant and Text Intended to Grant from counterpart European Application No. 20211677.8 dated Oct. 10, 2024, 38 pp.

Response to Extended Search Report dated Jun. 13, 2022, from counterpart European Application No. 20211677.8 filed Dec. 6, 2022, 38 pp.

* cited by examiner

FLEXIBLE TUBE ROUTING ACCESSORY FOR PERITONEAL DIALYSIS SYSTEM

CROSS-REFERENCE TO RELATED APPLICATIONS

The present application claims the benefit of and priority to EP Application No. 20211677.8 filed on Dec. 3, 2020. The entire contents of the foregoing application is incorporated by reference herein.

FIELD OF INVENTION

This invention relates to a peritoneal dialysis system and, in particular, to a flexible tube routing accessory for such a system.

BACKGROUND

The peritoneal dialysis process aims to remove waste products and excess fluid from the blood of a patient with a disease such as renal failure. Peritoneal dialysis might be required regularly (e.g., daily) for an extended period of time or, in some cases, life. Therefore, to minimise disruption to the life of the patient, peritoneal dialysis is often self-administered using a peritoneal dialysis system set up in the home of the patient.

Peritoneal dialysis systems comprise a preparator to generate peritoneal dialysis fluid and an automatic cycler to deliver the peritoneal dialysis fluid to the patient's peritoneal cavity. To generate peritoneal dialysis fluid, the preparator must be connected to a source of water and is therefore often located in a kitchen or bathroom of the patient's home. The automatic cycler is positioned next to the patient during peritoneal dialysis. Commonly, to allow the patient to be comfortable, the automatic cycler is positioned in a living room or a bedroom if peritoneal dialysis is to be performed over-night.

During peritoneal dialysis, it is necessary for peritoneal dialysis fluid to flow from the preparator to the automatic cycler. This is achieved using a flexible tube laid out between the preparator and the automatic cycler. A new flexible tube must be used for each peritoneal dialysis session for hygiene reasons.

Current peritoneal dialysis systems require the patient to manually route the flexible tube from the automatic cycler to the preparator. Replacement of the flexible tube is required for every dialysis cycle, and routing a new flexible tube between the preparator and the automatic cycler prior to each dialysis session may be difficult, time consuming and/or impractical for the patient because the preparator and the automatic cycler are often in different rooms of the patient's house. Furthermore, the exposed flexible tube is prone to kinking and damage during the routing process.

In view of the above, there exists a need for an improved peritoneal dialysis system that facilitates routing of a flexible tube between a preparator and an automatic cycler of the peritoneal dialysis system.

SUMMARY

The present invention in its broadest aspect provides a flexible tube routing accessory for routing a flexible tube between a preparator and an automatic cycler of a peritoneal dialysis system. The flexible tube routing accessory comprises a guide pipe through which the flexible tube is to be routed, a guide wire configured to pass through the guide pipe and selectively connect to the flexible tube, and a drive mechanism configured to move the guide wire through the guide pipe.

Advantageously, the flexible tube routing accessory facilitates routing a flexible tube between a preparator and an automatic cycler of a peritoneal dialysis system. Furthermore, the guide pipe helps to protect the flexible tube from damage during the routing process and whilst peritoneal dialysis takes place. The guide pipe also allows the flexible tube to be routed along pathways that may not be accessible without the flexible tube routing accessory, for example, through walls.

In any embodiment, the flexible tube routing accessory may further comprise a clamp located at an end portion of the guide wire for selectively attaching the guide wire to the flexible tube.

In any embodiment, the guide wire may be a spiral wire.

Advantageously, a spiral wire can transmit a force under tension and compression. Therefore, the spiral guide wire can be pushed and pulled through the guide pipe to move the flexible tube.

In any embodiment, the drive mechanism may be a winding mechanism including a pulley for the guide wire to wrap around.

In embodiments, the winding mechanism includes an electric motor to drive rotation of the pulley.

Advantageously, this reduces the workload of the user.

In embodiments, the winding mechanism has a wind mode for moving the guide wire in a first direction through the guide pipe and an unwind mode for moving the guide wire in a second direction through the guide pipe, the second direction being opposite the first direction.

In embodiments, the winding mechanism includes a wind button and an unwind button configured to enter the winding mechanism into the wind and unwind mode respectively.

In embodiments, the winding mechanism includes a handle configured to drive rotation of the pulley.

Advantageously, this may provide a more cost-effective flexible tube routing accessory.

In any embodiment, the winding mechanism may be configured to generate an alert when the guide wire has been wound or unwound a required amount.

In any embodiment, the guide pipe may include structural reinforcements. The structural reinforcements may be annular ribs extending down at least a portion of the guide pipe.

Advantageously, structural reinforcements can enhance the properties of the guide pipe, for example, increased flexibility or strength.

In embodiments, the drive mechanism includes a first and a second winding mechanism and the guide wire includes a first and a second guide wire, the first and the second guide wires being attached at one end to the first and second winding mechanisms respectively and at a second end to the clamp.

Advantageously, the first and second guide wires are only required to pull and therefore are not required to be made from a material which can transmit a force under compression. Furthermore, using two winding mechanisms may provide increased control over the movement of the guide wire and of the flexible tube.

A further aspect of the invention provides a peritoneal dialysis system comprising a preparator, an automatic cycler, a flexible tube and the flexible tube routing accessory of any previous embodiment.

In any embodiment, the peritoneal dialysis system may comprise at least one sterile end cap configured to be placed on an end portion of the flexible tube.

Advantageously, this maintains the sterility of the flexible tube.

A further aspect of the invention provides a flexible tube configured to be attached to the guide wire of the flexible tube routing accessory of any preceding claim.

In any embodiment, the flexible tube may comprise a connection feature that is complementary to a connection feature of the guide wire.

BRIEF DESCRIPTION OF THE DRAWINGS

Various examples of the invention will now be described, by way of illustration only, with reference to the figures in which.

DETAILED DESCRIPTION

Unless defined otherwise, all technical and scientific terms used generally have the same meaning as commonly understood by one of ordinary skill in the art.

The term "comprising" includes, but is not limited to, whatever follows the word "comprising". Use of the term indicates the listed elements are required or mandatory but that other elements are optional and may be present.

The term "consisting of" includes and is limited to whatever follows the phrase "consisting of". The phrase indicates the limited elements are required or mandatory and that no other elements may be present.

The term "consisting essentially of" includes whatever follows the term "consisting essentially of" and additional elements, structures, acts or features that do not affect the basic operation of the apparatus, structure or method described.

The term "generating an alert" or to "generate an alert" may refer, for example, to generating or signalling to a user a state or condition of a system. The term "alert" refers to any sign, text, voice, video, image or any indication of a state or a condition of a system. An alert can be given based on measurements of a sensor, for example, when a pressure level of fluid exceeds a predetermined range, or ammonia is detected in the fluid.

The term "sensor" may refer, for example, to a device, module, or system that can detect events or changes in its environment and indicate the information or send the information to other electronics, often a computer processor.

Figure 1:
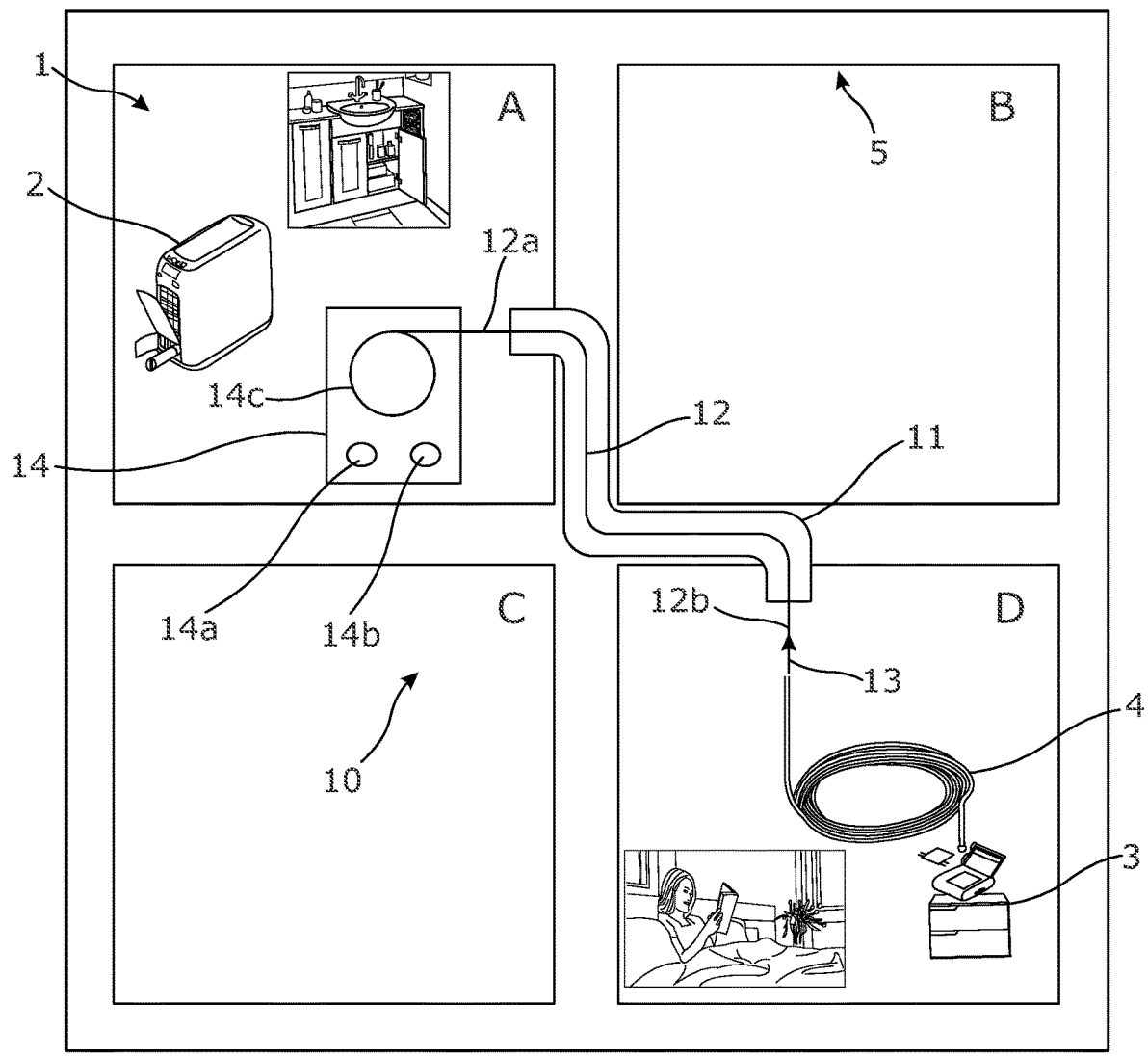
FIG. 1 shows a dialysis system, including a flexible tube routing accessory, prior to the routing process taking place in accordance with an example of the present invention.

FIG. 1 shows an example of a peritoneal dialysis system 1 according to the present invention. The peritoneal dialysis system 1 is set up in the patient's home 5 which is represented by four rooms A-D. The peritoneal dialysis system 1 includes a preparator 2, an automatic cycler 3, a flexible tube 4 and a flexible tube routing accessory 10. The preparator 2 is positioned in a first room A which includes a water source to enable the preparator to generate peritoneal dialysis fluid. The water source may comprise, for example, a tap (faucet) in the kitchen or in a bathroom (so that room A might, for example, represent a kitchen or a bathroom). The automatic cycler 3 is positioned in a second room D where the patient intends to undergo peritoneal dialysis. The second room D typically provides a comfortable location for the patient during the peritoneal dialysis, and hence may represent a living room or a bedroom (for example). A new flexible tube 4 must be routed from the preparator 2 to the automatic cycler 3 or vice versa before the start of each peritoneal dialysis session. To help achieve this, the flexible tube routing accessory 10 is used.

With continued reference to FIG. 1, the flexible tube routing accessory 10 comprises a guide pipe 11, a guide wire 12, a clamp 13 and a drive mechanism, for example, the winding mechanism 14. The guide pipe 11 interconnects the room A containing the preparator 2 and the room D containing the automatic cycler 3. This may involve passing the guide pipe through one or more walls of the home 5. This can be advantageous because it is less intrusive into the home of the patient. The guide pipe 11 can be formed using various techniques, for example, using multiple sections or using one continuous structure. Moreover, the guide pipe 11 can be made of any suitable material/s, for example, PVC piping or rubber tubing. It is envisioned that the guide pipe 11 may be made from multiple materials, for example, a rigid material may be used for straight sections and a flexible material used for sections that are required to bend. The guide pipe 11 may also include structural reinforcements such as annular ribs 11a which can provide additional strength and also flexibility. The annular ribs 11a may extend down the entirety of the length of the guide pipe 11 or down select portions of the guide pipe 11. It is envisioned that the guide pipe 11 is laid out at the time of installation of the peritoneal dialysis system 1; however, it is possible for the guide pipe 11 to be retrofitted with existing peritoneal dialysis systems. The guide pipe 11 has a diameter greater than that of the flexible tube 4 so that the flexible tube 4 can pass through the guide pipe 11.

Similarly, the guide wire 12 and the clamp 13 are suitably dimensioned to pass through the guide pipe 11. The guide wire 12 extends through the guide pipe 11 as shown in FIG. 1. The guide wire 12 is, for example, a spiral wire and includes a first end portion 12a attached to the winding mechanism 14 and a second end portion 12b including the clamp 13. It is envisioned that any wire or configuration of wire materials capable of transmitting a force under compression and under tension may be used. The guide wire 12 may be made from any suitable material, for example, a metal. Alternatively, the guide wire 12 may be made from more than one material, for example, a metal coated in plastic. The clamp 13 may be any suitable fastener which can grip and hold onto the flexible tube 4 during the routing process.

Figure 2:
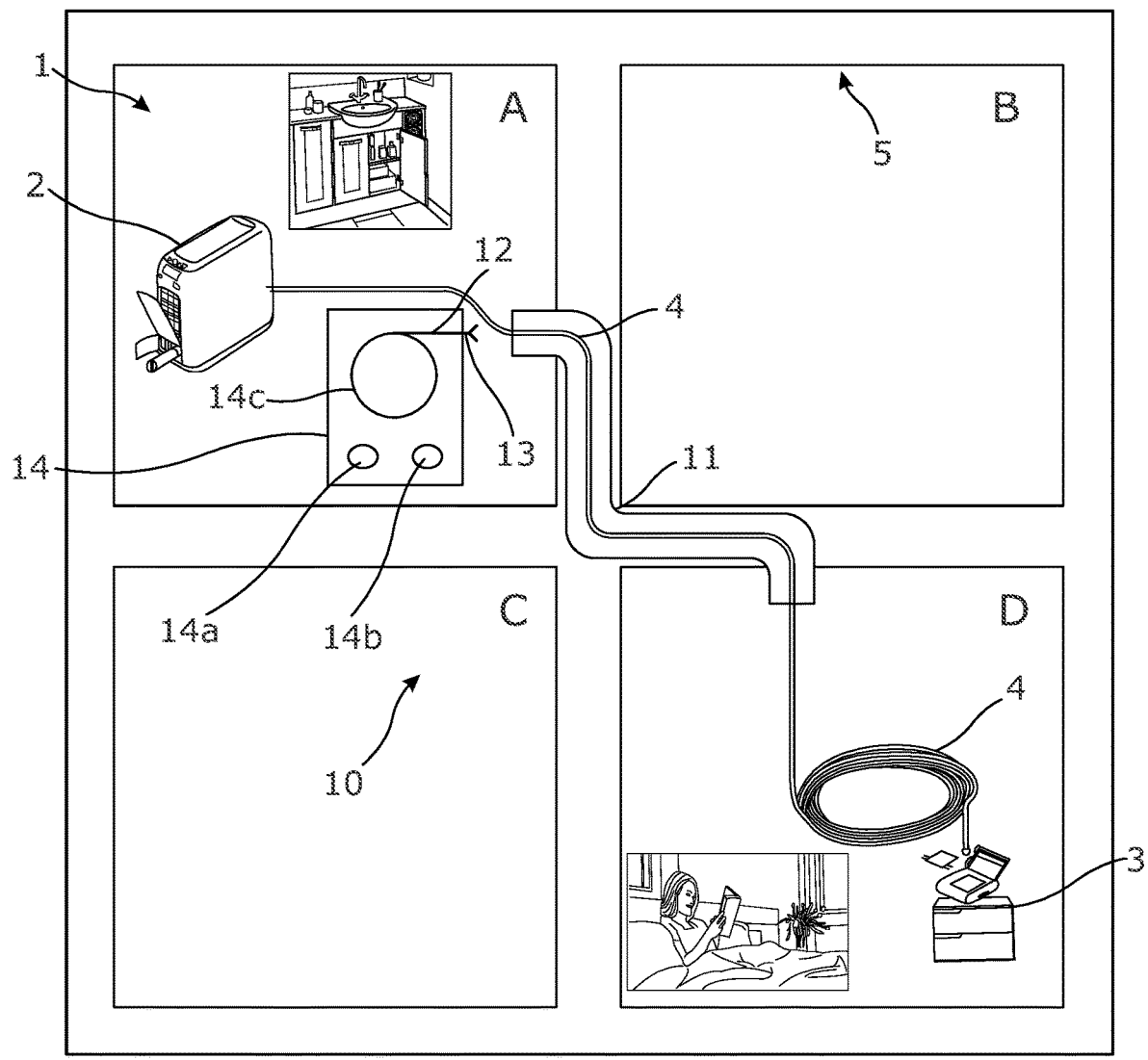
FIG. 2 shows the dialysis system of FIG. 1 after the routing process has taken place.
Figure 3:
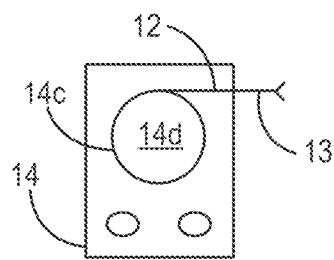
FIG. 3 shows the driving mechanism of FIG. 1 with an electric motor.
Figure 4:
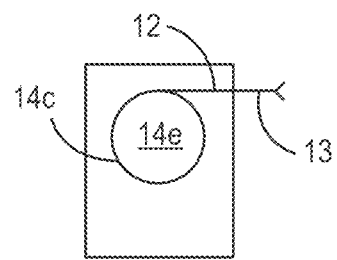
FIG. 4 shows the driving mechanism of FIG. 1 with a handle.
Figure 5:
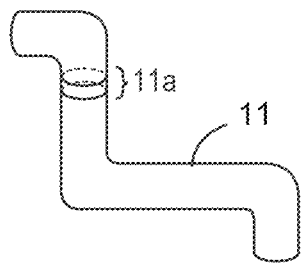
FIG. 5 shows the guide pipe of FIG. 1 with annular ribs.
Figure 6:
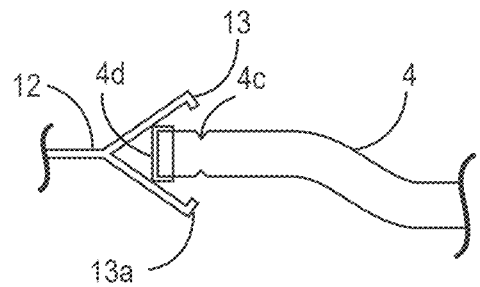
FIG. 6 shows flexible tube with a sterile end cap and connection feature.

To route the flexible tube 4 from the room D containing the automatic cycler 3 to the room A containing the preparator 2, the flexible tube 4 is attached to the second end 12b of the guide wire 12 using the clamp 13. The user then presses a wind button 14a of the winding mechanism 14 to wind up the guide wire 12, thereby placing the guide wire 12 under tension to pull the flexible tube 4 with the guide wire 12 through the guide pipe 11. This process can be stopped when a portion of the flexible tube 4 enters the room A containing the preparator 2. The portion of the flexible tube 4 in the room A containing the preparator 2 is then connected to the preparator 2 ready for a peritoneal dialysis session. The routed flexible tube 4 configuration is shown in FIG. 2.

When the peritoneal dialysis session is complete, the flexible tube 4 must be disposed of. Therefore, it is necessary to pass the flexible tube 4 back through the guide pipe 11. To achieve this, the flexible tube 4 is reattached to the guide wire 12 using the clamp 13. The user then presses an unwind button 14b of the winding mechanism 14 to compress the guide wire 12 and push the guide wire 12 along with the flexible tube 4 back through the guide pipe 11. Alternatively, the flexible tube 4 can be manually pulled back through the guide pipe 11 from the room D containing the automatic cycler 3. Once the flexible tube 4 is back in the room D containing the automatic cycler 3, the flexible tube 4 can be unclamped from the guide wire 12 and disposed of.

The winding mechanism 14 comprises a pulley 14c for the guide wire 12 to wrap around and an electric motor 14d to drive rotation of the pulley 14c. The winding mechanism 14 also includes a wind button 14a and an unwind button 14b configured to enter the winding mechanism 14 into a wind mode and an unwind mode respectively. In the wind mode, the electric motor drives the pulley 14c to wind the guide wire 12 about the pulley 14c. In the unwind mode, the electric motor drives the pulley 14c to unwind the guide wire 12 from the pulley 14c. It is envisioned that the winding mechanism 14 may generate an alert to the user when the guide wire 12 has been wound or unwound a required amount, for example, when the flexible tube 4 has entered the room A containing the preparator. This may involve the flexible tube routing accessory 10 including one or more sensors, for example, a motion sensor placed in the guide pipe 11. Information from the sensor/s may be transmitted to the winding mechanism 14 using any known wired or wireless technique.

Alternatively, the winding mechanism 14 may be manually powered. This may include a handle 14e for driving rotation of the pulley 14c. It is envisioned that the winding mechanism 14 can be placed in the room A containing the preparator 2 or the room D containing the automatic cycler 3. This will enable the user to pass the flexible tube from the preparator 2 to the automatic cycler 3 or vice versa depending on which is more convenient for the user.

The flexible tube 4 may be kept sterile during the routing process using sterile end caps 4d. The sterile end caps 4d can be placed on either end of the flexible tube 4 to prevent contaminants entering the flexible tube 4. It is possible for one end of the flexible tube 4 to be connected to the automatic cycler 3 prior to routing taking place. In this instance, only one sterile end cap is needed to maintain the sterility of the flexible tube 4 by covering the end of the flexible tube 4 which is to be connected to the preparator 2.

Figure 7:
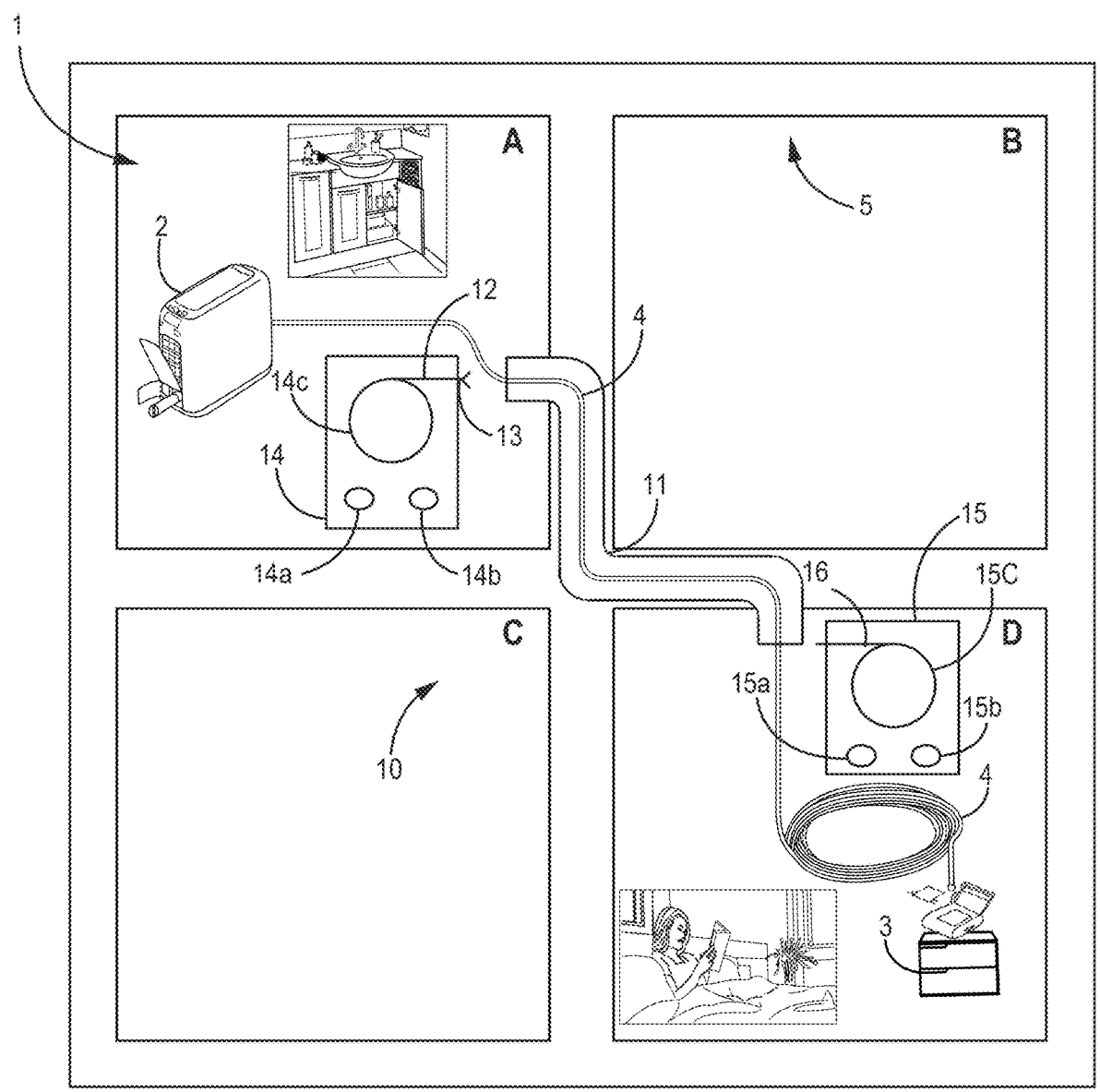
FIG. 7 shows a second winding mechanism and a second guide wire.

In another example of a peritoneal dialysis system as shown in FIG. 7, the drive mechanism comprises a first and a second winding mechanism 14 and 15, the first 14 being in the room A containing the preparator 2 and the second 15 being in the room D containing the automatic cycler 3. The guide wire includes a first and a second guide wire 12 and 16, the first and second guide wires being attached at one end to the first and second winding mechanisms respectively and at a second end to the clamp 13. In this way, the flexible tube 4, when attached to the clamp 13, can be pulled in either direction through the guide pipe 11 using the first and second winding mechanisms. In this set up, the guide wires 12 and 16 are only required to pull and therefore are not required to transmit a force under compression. This may enable alternative, possibly cheaper, wires or wire configurations to be used.

The flexible tube 4 is configured to be attached to the guide wire 12 via the clamp 13. For example, the flexible tube 4 may have a connection feature 4c that is complementary to a connection feature 13a of the guide wire/clamp. This might be a groove or cut out defined in an outer surface of the flexible tube 4 or a protrusion extending from the outer surface of the flexible tube 4. Additionally or alternatively, a portion of the outer surface of the flexible tube 4 is rough to help attach the flexible tube 4 to the guide wire 12. The flexible tube 4 may also have a visual indicator to indicate to the user where the clamp 13 should be attached.

What is claimed is:

1. A flexible tube routing accessory for routing a flexible tube between a preparator and an automatic cycler of a peritoneal dialysis system, the flexible tube routing accessory comprising:
   a guide pipe through which the flexible tube is to be routed;
   a guide wire configured to pass through the guide pipe and to selectively attach to the flexible tube; and
   a drive mechanism configured to move the guide wire and the flexible tube bidirectionally through the guide pipe.

2. The flexible tube routing accessory according to claim 1, further comprising a clamp located at an end portion of the guide wire for selectively attaching the guide wire to the flexible tube.

3. The flexible tube routing accessory according to claim 2, wherein the drive mechanism includes a first winding mechanism and a second winding mechanism and the guide wire comprises a first guide wire and a second guide wire, the first guide wire and the second guide wire being attached at one end to the first winding mechanism and the second winding mechanism respectively and at a second end to the clamp.

4. The flexible tube routing accessory according to claim 1, wherein the guide wire is a spiral wire.

5. The flexible tube routing accessory according to claim 1, wherein the guide wire is made of more than one material.

6. The flexible tube routing accessory according to claim 1, wherein the drive mechanism is a winding mechanism including a pulley for the guide wire to wrap around.

7. The flexible tube routing accessory according to claim 6, wherein the winding mechanism includes an electric motor to drive rotation of the pulley.

8. The flexible tube routing accessory according to claim 7, wherein the winding mechanism has a wind mode for moving the guide wire in a first direction of two directions through the guide pipe and an unwind mode for moving the guide wire in a second direction of the two directions through the guide pipe to move at least the guide wire bidirectionally, the second direction being different from the first direction.

9. The flexible tube routing accessory according to claim 8, wherein the winding mechanism includes a wind button and an unwind button configured to enter the winding mechanism into the wind mode and the unwind mode respectively to move at least the guide wire bidirectionally.

10. The flexible tube routing accessory according to claim 6, wherein the winding mechanism is configured to generate an alert when the guide wire has been wound or unwound a required amount.

11. The flexible tube routing accessory according to claim 1 wherein the drive mechanism is a winding mechanism including a handle configured to drive rotation of a pulley of the winding mechanism.

12. The flexible tube routing accessory according to claim 1, wherein the guide pipe has structural reinforcements.

13. The flexible tube routing accessory according to claim 12, wherein the structural reinforcements are annular ribs extending down at least a portion of the guide pipe.

14. The flexible tube configured to be attached to the guide wire of the flexible tube routing accessory according to claim 1.

15. The flexible tube according to claim 14, the flexible tube comprising a connection feature that is complementary to a connection feature of the guide wire.

16. The flexible tube routing accessory according to claim 1,
wherein the guide pipe defines a lumen connected by a first opening and a second opening, and
wherein the drive mechanism is configured to move a first end of the flexible tube out of the guide pipe through the first opening and the first end of the flexible tube into the guide pipe through the first opening.

17. A peritoneal dialysis system, comprising:
a preparator;
an automatic cycler;
a flexible tube;
a flexible tube routing accessory configured to route the flexible tube between the preparator and the automatic cycler, the flexible tube routing accessory including:
a guide pipe through which the flexible tube is to be routed;
a guide wire configured to pass through the guide pipe and to selectively attach to the flexible tube; and
a drive mechanism configured to move the guide wire and the flexible tube bidirectionally through the guide pipe.

18. The peritoneal dialysis system according to claim 17, further comprising at least one sterile end cap configured to be placed on an end portion of the flexible tube.

19. The peritoneal dialysis system according to claim 17, wherein a diameter of the guide pipe is greater than a diameter of the flexible tube.

20. The peritoneal dialysis system according to claim 17,
wherein the guide pipe defines a lumen connected by a first opening and a second opening, and
wherein the drive mechanism is configured to move a first end of the flexible tube out of the guide pipe through the first opening and the first end of the flexible tube into the guide pipe through the first opening.

* * * * *